(No Model.) 2 Sheets—Sheet 2.
L. J. PHELPS.
AUTOMATIC ELECTRIC CIRCUIT BREAKER.
No. 281,202. Patented July 10, 1883.
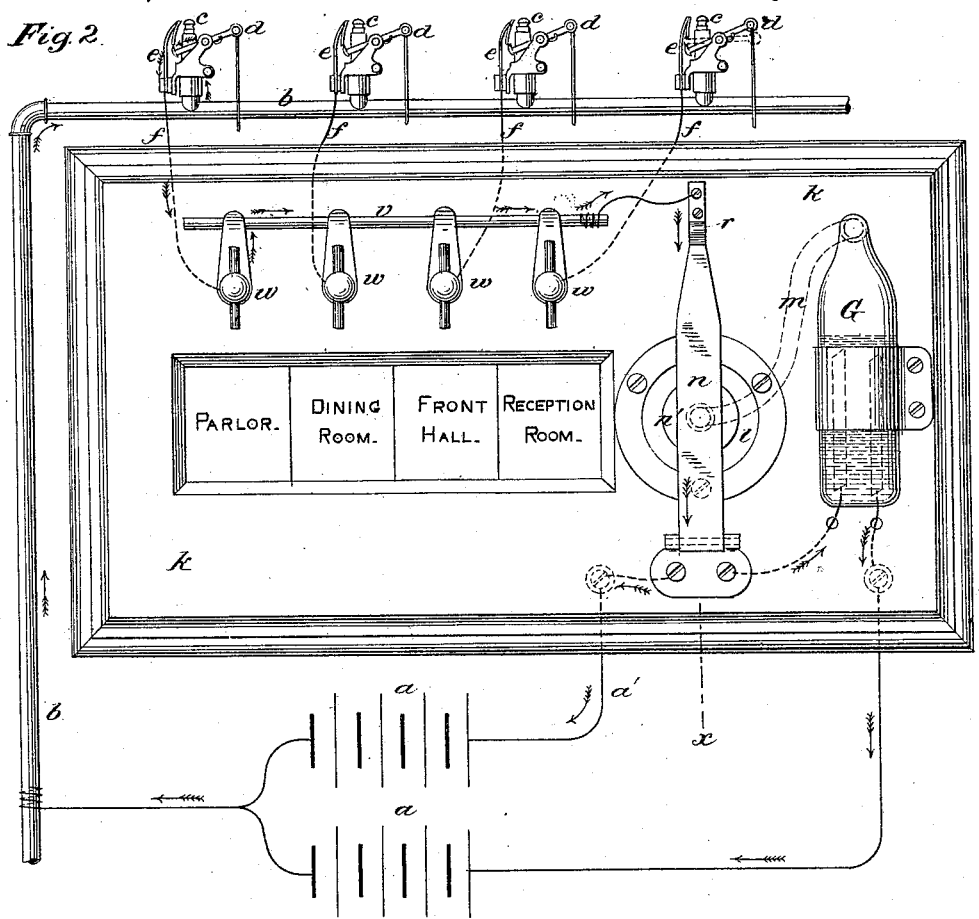
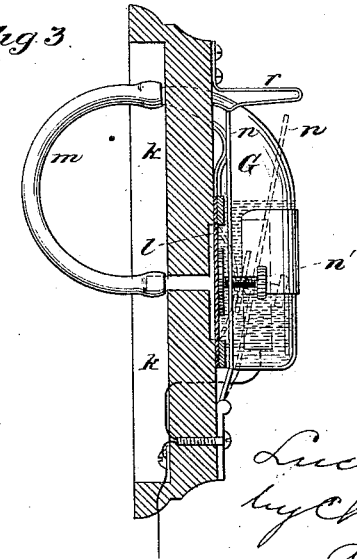
Witnesses
Jno. E. Travin
Charles Fox
Inventor
Lucius J. Phelps
by Chas. M. Higgins
Atty

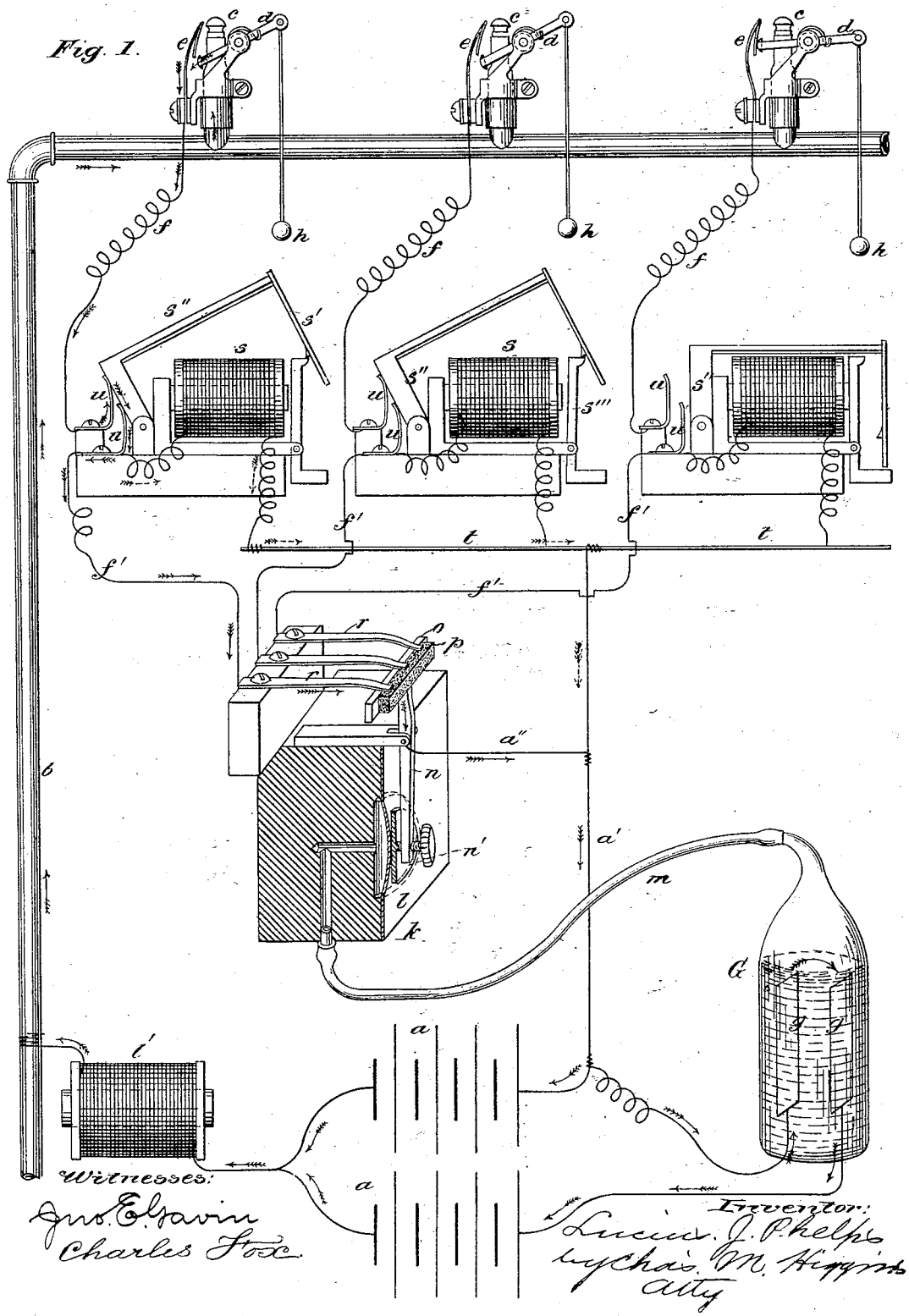

UNITED STATES PATENT OFFICE.

LUCIUS J. PHELPS, OF NEW YORK, N. Y.

AUTOMATIC ELECTRIC-CIRCUIT BREAKER.

SPECIFICATION forming part of Letters Patent No. 281,202, dated July 10, 1883.

Application filed February 13, 1883. (No model.)

*To all whom it may concern:*

Be it known that I, LUCIUS J. PHELPS, of the city, county, and State of New York, have invented certain new and useful Improvements in Automatic Electric-Circuit Breakers, of which the following is a specification.

My invention is more especially designed to serve as an automatic cut-off or circuit-breaker for gas-lighting circuits.

Briefly stated, the main feature of the invention consists, essentially, in the combination, with an electric circuit, of an electrolytic cell introduced in the circuit and energized thereby when closed, so as to evolve a pressure of gas or other product of electro-chemical decomposition, which, by means of a piston, diaphragm, or equivalent device, is made effective to operate a contact-breaker to break the electric circuit after a certain accumulation of gas has occurred.

The invention also consists in some special features of construction, as hereinafter fully set forth.

Figure 1 of the annexed drawings presents a diagram of an electric gas-lighting circuit equipped with my invention, and having annunciator-magnets to indicate when any section of the circuit becomes broken. Fig. 2 is partly an elevation and partly a diagram of a modified form of similar apparatus in which indicating-switches are used in place of annunciator-magnets. Fig. 3 is a cross-section on line *x x* of Fig. 2.

Corresponding parts in the two forms of apparatus are lettered similarly.

Referring first to Fig. 1, *a* indicates the battery or source of electricity for energizing the circuit.

*b* indicates the gas-pipes, on which a number of gas-burners, *c c c*, are mounted, according to the usual system of electric gas-lighting. Each of these burners is provided with any of the usual form of sparking-electrodes, which are respectively connected with positive and negative parts of the circuit.

*d* indicates the movable one of these electrodes, which is operated by the hand, and *e* represents the fixed but yielding electrode. The movable electrode *d* is in metallic connection with the burner and with the gas-pipe, which pipe is connected with one pole of the battery, as indicated in Fig. 1, usually the positive pole, so that hence all the movable electrodes *d* of the burners are of positive polarity. The yielding electrodes *e e* are insulated from the burners, and are connected by individual wires *f*, through certain intermediate connections shown, with the opposite pole of the battery, so that the yielding electrodes are hence of negative polarity. It will therefore be understood that when the manipulating-knob *h* of any burner is pulled down the movable electrodes will be swayed so as to first contact with the yielding electrode *e*, thus closing the circuit, and the continued motion of the movable electrode toward and over the tip of the burner will immediately after break the circuit by causing a separation of the electrodes at the tip of the burner, thereby producing a spark which will ignite the issuing gas in the well-known manner.

In order to render the spark more powerful, a large electro-magnet or sparking-coil, *i*, is usually introduced in the circuit between the gas-pipe and the battery, the reaction of which when the circuit is broken greatly increases the force of the spark in the well-known manner. After the spark has been thus produced and the gas ignited, a spring returns the movable electrode to its quiescent position as soon as released by the hand, as shown in the left of Fig. 1, where of course the electrodes are out of contact and the circuit broken. It will therefore be understood that the normal condition of the gas-lighting circuit is the open or broken condition, and that it is required to be but momentarily closed and immediately afterward broken in order to ignite the gas. For this reason batteries of the "open-circuit" kind—such as Leclanché—are generally used for these circuits, which are quite effective where the circuit requires to be closed momentarily, or only during a short time, at intervals, but which become rapidly useless if the circuit continues closed for an unusual time. Now, in gas-lighting circuits, as is well known, it sometimes happens that the circuit becomes accidentally closed, and so remains for an abnormal period. This is likely to occur from several causes—for instance, the crossing of the wires at some point, the wearing away of insulation, or by the formation of "grounds," or by the continued contact of the two electrodes on the burner, as shown on the right of Fig. 1, caused by some derangement of their action, or by careless or ignorant operation. Such continued closing of the circuit would render the battery useless, either by polarization or by exhaustion, according to the nature of the battery, and thus render the whole system inoperative. In order, therefore, to obviate this continued closing of the circuit, devices have been introduced into the circuit which act to break the circuit whenever it remains closed longer than a normal period, and at the same time indicate this fact, so as to prevent the exhaustion of the battery and call attention to the defect in the circuit, and at the same time locate the defect, thereby protecting the circuit and enabling defects to be readily corrected as soon as they arise.

Heretofore electro-magnets combined with a retarding device or with a clock-movement and connected with a contact-breaker have been employed for this purpose, whereas, according to my invention, I employ an electrolytic cell, arranged as will now appear, which possesses important advantages.

In Fig. 1, G indicates the electrolytic cell, which is preferably formed by a little glass bottle inclosing two platinum terminals, $g\ g$, respectively positive and negative, immersed in acidulated water, which nearly fills the bottle, as shown. Platinum wires sealed into the base of the bottle connect the terminals with the external circuit, as illustrated, so that the circuit is completed through the electrolytic cell, and whenever the circuit is closed the acidulated water becomes decomposed and evolves a pressure of gas in the well-known manner. The neck of the bottle is drawn out into a fine tube, which is coupled with a rubber tube, $m$, which connects to a right-angled bore in a wooden or porous block, $k$, which bore opens into a recess on the face of the block, over which is cemented a sheet of rubber, $l$, thus forming a diaphragm, as will be understood. The long arm of a contact-making and breaking lever, $n$, overlies the diaphragm $m$, and is provided with an adjusting-screw and a bearing-plate, $n'$, which bears on the diaphragm, as shown. The short arm of the lever projects above the block, and is provided with a conducting cross-bar, $p$, parallel therewith. A series of contact-tongues, $r$, are fixed on the top of the block $k$, and their free ends project over the cross-bars $o\ p$, and will contact with either bar, according as the lever is swayed in or out by the distention or collapse of the diaphragm, as will be understood.

The negative-battery wire $a'$ connects by the branch $a''$ to the lever $n$, which is in metallic connection with the contact-bar $o$, while the contact-tongues $r$ are connected with the respective burners by the respective individual wires $f$, as shown, each of which wires is connected with one of the tongues $r$, the tongues being insulated from each other at their fixed ends. Each of the burners, or rather each set of burners, is represented by a distinct annunciator-magnet, $s$, of ordinary construction. The indicator plate or tag $s'$ of the magnet is fixed on the end of a bent metal arm, $s''$, which is pivoted at the back of the magnet, while the armature $s'''$ acts as a pawl to uphold said tag when in its retracted position, but allows said tag to fall, and thus give its announcement when the pawl is attracted by the circuiting of the magnet, as shown on the right of Fig. 1. Now, each of the yielding electrodes $e\ e$ on the burners are connected, respectively, with one of the contact-tongues $r$ by the individual wires $f$ through two separate springs, $u\ u$, at the back of the annunciator-magnets, which springs are electrically connected by contact with the pivotal arm $s''$ of the annunciator-tag when raised, as shown on the left of Fig. 1. Now, the coils of magnets $s$ are not in the direct circuit with the contact-tongues $r$, but in a shunt around the tongues—that is, one end of all the coils connect to a bar, $t$, which is connected with the negative-battery wire $a'$, while the other ends of the coils connect individually to one of the individual contact-springs $u$, as fully shown in Fig. 1. It will therefore be seen that the apparatus contains two sets of contacts—that is, the main contact $r\ o\ n$ in the general circuit, including all the burners, and controlled by the diaphragm $l$ and the cell G, and the minor or individual contacts $u\ u$ in the individual circuit of each burner or set of burners, and controlled by the annunciator-tag.

The construction of the circuit being now set forth, I would first remark, before referring to the operation, that in practice each annunciator-magnet $s$ will of course represent a whole section or series of burners in certain sections of the house, instead of the single burners shown, in which case all the yielding electrodes on each section of burners will connect with the individual wires $f f$; but of course the single burners shown fully illustrate the principle.

In Fig. 1 the diaphragm is shown distended and the contact-lever $n$ swayed, so that the non-conducting bar $p$ is moved under the tongues $r$; but when the apparatus is at rest, however, the diaphragm will be collapsed and the contact-lever retracted, so that the conducting-bar $o$ will be in contact with the tongues $r$, and the electrodes on the burners will be presumably out of contact and the entire circuit open, thus rendering the battery $a$ and the electrolytic cell G inactive. If, now, the electrodes on any burner were moved so as to make and break contact, the circuit would be momentarily closed and immediately afterward broken, thus igniting the gas and rendering the battery and electrolytic cell momentarily active. During this moment of activity the course of the current would be as follows, referring to the left side of Fig. 1: From the positive pole of the battery the current would flow through the spark-coil $i$ to the gas-pipes, thence from the movable electrode $d$ on the burner to the yielding electrode $e$, through the wire $f$ to the springs $u\ u$ and tag-lever $s''$, to the wire $f'$, and thence to the contact-tongues $r$, the bar $o$, and lever $n$, to the wires $a''\ a'$, through the electrolytic cell G, and thence to the opposite pole of the battery. This momentary flow of the current would not of course generate any appreciable amount of gas in the electrolytic cell G, and would not have any effect on the diaphragm $l$, and hence the main contact $r\ o\ n$ would remain closed. This flow of the current would also have no appreciable effect on the annunciator-magnets $s\ s$, as they are all situated in a shunt around the contact $r\ o\ n$, which shunt, owing to the fine long wire of the magnet-coils, is of much higher resistance than the main path through the contact $r\ o\ n$, and hence no appreciable current would flow through the magnets while the contacts $r\ o\ n$ are closed. We will now suppose, however, that the main circuit remains closed through one of the burners or one set of the burners longer than a normal interval, as indicated at the burner on the right of Fig. 1, in which case the cell G will hence continue to generate gas, which, by a slow cumulative action, will distend the diaphragm $l$, and thus sway the contact-lever $n\ o$, so as to bring the non-conducting bar $p$ under the contact-tongues $r$, thus breaking the general circuit at the main contact. The current will now be diverted from its main path of low resistance through the aforesaid shunt—that is, through the coil of the magnet corresponding to the burner or set of burners at which the circuit is closed—so that, instead of flowing, as before, from the individual contacts $u\ u$ to the general contact $r\ o\ n$, it will now flow from the individual contact $u\ u$, through the magnet-coil, to the bar $t$, and thence return to the wire $a'$ and battery, as before. This diversion of the current will of course energize the magnet through which it flows, and thus cause it to attract its armature and drop its tag, as shown on the right of Fig. 1, thus breaking the circuit at the individual contact $u\ u$, and as the general circuit has been just previously broken at the general contact $r\ o\ n$, the entire circuit is thus opened, and any injury to the battery is thus effectually prevented. The battery $a$ therefore ceases to act, as does also the electrolytic cell G, while the gas which has been already generated, and which has distended the diaphragm $l$, will now gradually escape through the pores of the wooden block $k$, thus allowing the diaphragm to collapse, and thereby allowing the main contact $r\ o\ n$ to become again closed, which closing will occur in a minute or a fraction of a minute after the circuit is broken. The general circuit will therefore be restored to its normal condition, while the individual circuit, or the section of the general circuit which has become defective, as on the right of Fig. 1, will still be broken at the individual contact $u\ u$, due to the fall of the annunciator-tag, which will of course indicate to the attendant what section has become defective, so that the defect can be readily found and corrected. When the defect is remedied the fallen tag may be raised, thus closing its individual contact and rendering the apparatus again ready for its detecting and protecting action, if it should ever be required.

It will be readily appreciated that the electrolytic cell, with its diaphragm and operating-lever, has special advantages for this purpose, as when the circuit is closed it gives a slow cumulative action, which culminates at the end of a predetermined interval, and thus forms an efficient electro-motive device for circuits where such an action is desirable, whereas an electro-magnet acts instantly when the circuit is closed, so that retarding or timing devices have to be combined with it to get the slow culminating action desired.

An electrolytic cell of no greater size than that illustrated in the drawings will supply a sufficient quantity of gas to endure the ordinary usage required of it for two or more years without any attention, thereby presenting the important advantage of simplicity.

Instead of the diaphragm $l$, a cylinder and piston or any equivalent device may of course be used, and any other form of contact-maker besides that shown may be used, as will be readily understood, without departing from the invention.

It will be noted on reference to Fig. 1 that the battery is divided into two sections, one section being in direct circuit with the electrolytic cell, and thence with the general circuit, while the other section supplies the general circuit exclusive of the electrolytic cell. The reason of this is that, as the electrolytic cell offers considerable resistance, it would be undesirable to have the entire battery in direct circuit with it, for in that case a strong spark could not always be obtained at the burners, owing to the resistance at the cell G; but by employing one section of battery to supply the circuit for the spark and the other section to supply the cell, and at the same time assist the other section in producing the spark, a very efficient action is secured.

In Figs. 2 and 3 a simpler form of my automatic cut-off instrument is shown. In this case the block $k$ is formed in the shape of a neatly-molded base-board, which may be affixed against the wall and sustains the chief portions of the instrument. On the front of the board is mounted the electrolytic cell G, the diaphragm $l$, the contact and diaphragm lever $n$, and the contact-tongue $r$. The neck of the cell G projects through the back of the board, as seen in Fig. 3, and is connected by the tube $m$ with the diaphragm-chamber at the back of the board, as well shown in both figures, with precisely the same effect as before described. The contact-tongue $r$ connects to a switch-bar, $v$, extending along the top of the board, and a series of switch-levers or turn-buttons, $w$, are pivoted on the board below this bar, and may be turned onto or off the bar, as will be understood. Each switch represents one of the burners or sets of burners, as indicated, and in a panel below the switches printed tags are inserted, showing the sections of burners which are represented thereby, as illustrated in Fig. 2. The individual wires *f* from the burners connect to the switches, as shown.

The several connections to the instrument are made on the back of the board, as shown in Fig. 1, and the general arrangement being now made plain, the course of the current when the circuit is closed at the burner will be as follows: from the battery *a a* to the gas-pipe *b* and to the electrodes on the burner, thence through one of the wires *f* to one of the switches *w*, to the switch-bar *v*, and thence to the contact-tongue *r* and diaphragm-lever *n*, from whence the current flows through the cell G and returns to the battery, as indicated by arrows. If the circuit remains closed but momentarily at the burner to light the gas, as before described, the cell G, diaphragm *l*, and contact-lever *n* will not be appreciably affected, and the circuit will remain intact; but if the circuit remains closed for an abnormal interval of time the continued generation of gas in the cell G will act to distend the diaphragm *l* and press out the lever *n*, thus causing the lever to fall away from the contact-tongue *r*, as indicated by dotted lines in Fig. 3, thereby breaking the circuit and stopping the action of the battery. The fall of the lever *n* will indicate to the attendant that some defect exists in the circuit. The attendant may now approach the instrument, and first turning up the lever *m*, so as to close the contact *r n*, he then proceeds to turn each of the switches alternately off from and onto the bar *v*, when a spark will be observed at the switch which represents the defective section of the circuit, thereby indicating the location of the defect, which may be then found and corrected, after which the parts of the instrument may be set or left in their normal positions, as shown in Fig. 2, when the instrument will be again ready for its detective duty.

Instead of having the diaphragm-chamber in a porous block or casing, an imporous casing may of course be used with a small vent, which will allow the gradual escape of the gas to permit the collapse of the diaphragm, as will be understood.

The electrolytic cell need not be necessarily distinct from the battery, for where a battery is used which evolves gas when the circuit is closed, the battery may then serve as the electrolytic cell by being inclosed at the top and connected with the diaphragm-chamber, with substantially the same effect as if a distinct electrolytic cell were used.

It may be readily understood that in some cases the electrolytic contact maker and breaker may be employed to make or break a separate circuit from that which energizes itself; but in most cases the device will be employed to act on its own circuit, as herein illustrated.

Having thus set forth the principle of my invention and its detailed construction and operation, what I claim as my invention is as follows:

1. The combination, with a system of gas-burners and an electric circuit connected with sparking-electrodes thereon, of an electrolytic cell introduced in said circuit, and a contact device controlling said circuit and operatively connected with the cell, whereby the closing of the circuit during a prolonged interval will operate said contact device by electrolytic action in a slow cumulative manner, and finally break the circuit, substantially as and for the purpose herein set forth.

2. The combination, with an electric circuit, and with an electrolytic cell introduced therein, of a battery or generator of electricity energizing said circuit, formed in two divisions, one division energizing the circuit through the electrolytic cell, and the other division energizing the circuit independent of the cell, substantially as and for the purpose set forth.

3. The combination, with an electric circuit and with an electrolytic cell introduced therein, of a porous or capillary vented chamber connected with the cell, and a diaphragm, or its equivalent, covering said chamber, and distended by the accumulation of gas therein, and allowed to collapse by the leakage of the gas through the pores or vents of said chamber, with a circuit-breaking device operatively connected therewith, substantially as and for the purpose set forth.

LUCIUS J. PHELPS.

Witnesses:
JNO. E. GAVIN,
CHAS. M. HIGGINS.